15304B2

United States Patent
Kim et al.

(10) Patent No.: US 11,365,304 B2
(45) Date of Patent: *Jun. 21, 2022

(54) FOAMING RESIN COMPOSITION, PREPARATION METHOD THEREFOR, AND FOAM USING SAME

(71) Applicant: LOTTE CHEMICAL CORPORATION, Seoul (KR)

(72) Inventors: Ju Sung Kim, Uiwang-si (KR); You Hyun Kim, Uiwang-si (KR); Yoen Kyoung Kim, Uiwang-si (KR); Kang Yeol Park, Uiwang-si (KR); Seung Yong Bae, Uiwang-si (KR); Bong Jae Jeong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/347,929

(22) PCT Filed: Nov. 30, 2017

(86) PCT No.: PCT/KR2017/013955
§ 371 (c)(1),
(2) Date: May 7, 2019

(87) PCT Pub. No.: WO2018/117473
PCT Pub. Date: Jun. 28, 2018

(65) Prior Publication Data
US 2020/0056008 A1    Feb. 20, 2020

(30) Foreign Application Priority Data

Dec. 23, 2016 (KR) .................. 10-2016-0177858
Nov. 27, 2017 (KR) .................. 10-2017-0159551

(51) Int. Cl.
| | |
|---|---|
| *C08J 9/18* | (2006.01) |
| *A01N 59/16* | (2006.01) |
| *B29C 44/34* | (2006.01) |
| *C08J 9/00* | (2006.01) |
| *C08J 9/228* | (2006.01) |
| *C08L 25/06* | (2006.01) |
| *B29C 44/42* | (2006.01) |
| *B29K 509/02* | (2006.01) |

(52) U.S. Cl.
CPC .............. *C08J 9/18* (2013.01); *A01N 59/16* (2013.01); *B29C 44/3461* (2013.01); *C08J 9/0066* (2013.01); *C08J 9/228* (2013.01); *C08L 25/06* (2013.01); *B29C 44/42* (2013.01); *B29K 2509/02* (2013.01); *C08J 2203/14* (2013.01); *C08J 2203/22* (2013.01); *C08J 2325/06* (2013.01); *C08J 2429/04* (2013.01); *C08J 2491/06* (2013.01); *C08L 2203/14* (2013.01); *C08L 2205/03* (2013.01)

(58) Field of Classification Search
CPC ............ C08J 9/18; C08J 9/0066; C08J 9/228; C08J 2203/14; C08J 2203/22; C08J 2325/06; C08J 2429/04; C08J 2491/06; C08J 2203/142; C08J 2201/03; C08J 9/144; C08J 9/141; C08J 9/14; C08J 9/143; A01N 59/16; B29C 44/3461; B29C 44/42; B29C 44/3449; B29C 44/3453; C08L 25/06; C08L 2203/14; C08L 2205/03; C08L 25/04; B29K 2509/02; C08F 112/08; C08F 2/44; C08K 3/22; C08K 2201/006; C08K 2201/005; C08K 2003/2296
See application file for complete search history.

(56) References Cited

U.S. PATENT DOCUMENTS

| | | |
|---|---|---|
| 3,041,303 A | 6/1962 | Nelson |
| 3,354,108 A | 11/1967 | Paradis et al. |
| 4,331,786 A | 5/1982 | Foy et al. |
| 4,356,300 A | 10/1982 | Isler et al. |
| 4,612,340 A | 9/1986 | Ohachi |
| 5,151,457 A | 9/1992 | Ishida et al. |
| 5,714,534 A | 2/1998 | Kojima et al. |
| 5,714,545 A | 2/1998 | Lee et al. |
| 5,906,679 A | 5/1999 | Watanabe et al. |
| 6,166,116 A | 12/2000 | Sleeckx |
| 6,297,307 B1 | 10/2001 | Eichenauer et al. |

(Continued)

FOREIGN PATENT DOCUMENTS

| | | |
|---|---|---|
| CN | 1710153 A1 | 12/2005 |
| CN | 1919542 A | 2/2007 |

(Continued)

OTHER PUBLICATIONS

Benhedal Using zinc oxide powders, Alex. Eng. J., p. 517, May (Year: 2013).*
Jesionowski Zinc Oxide Synthesis, Materials, p. 2833, April (Year: 2014).*
International Search Report in counterpart International Application No. PCT/KR2017/013955 dated Feb. 22, 2018, pp. 1-4.
Padmavathy, N. et al., "Enhanced bioactivity of ZnO nanoparticles-an antimicrobial study", Science and Technology of Advanced Materials, Sep. 1, 2008, vol. 9, No. 3, p. 35004 (7pp).
Search Report in commonly owned European Application No. 17210669.2 dated Apr. 20, 2018, pp. 1-5.

(Continued)

*Primary Examiner* — Matthew P Coughlin
*Assistant Examiner* — Thurman Wheeler
(74) *Attorney, Agent, or Firm* — Additon, Pendleton & Witherspoon, P.A.

(57) ABSTRACT

A foaming resin composition of the present invention contains an aromatic vinyl-based resin and zinc oxide, wherein the size ratio (B/A), in which peak A is a 370 nm to 390 nm region and peak B is a 450 nm to 600 nm region, of zinc oxide is approximately 0.01 to approximately 1 when photoluminescence is measured, and the BET surface area thereof is approximately 1 $m^2/g$ to approximately 10 $m^2/g$.

19 Claims, No Drawings

(56) References Cited

U.S. PATENT DOCUMENTS

| | | | |
|---|---|---|---|
| 6,663,877 | B1 | 12/2003 | Appleton et al. |
| 6,773,803 | B2 | 8/2004 | Lee et al. |
| 6,893,739 | B2 | 5/2005 | Lee et al. |
| 6,939,623 | B2 | 9/2005 | Kim et al. |
| 7,128,973 | B2 | 10/2006 | Park |
| 8,128,998 | B2 | 3/2012 | Li et al. |
| 9,902,850 | B2 | 2/2018 | Kim et al. |
| 2002/0106413 | A1 | 8/2002 | Herbst et al. |
| 2002/0109805 | A1 | 8/2002 | Baba |
| 2003/0125413 | A1 | 7/2003 | Herbst et al. |
| 2005/0043485 | A1 | 2/2005 | Lee et al. |
| 2005/0131100 | A1 | 6/2005 | Herbst et al. |
| 2006/0247338 | A1 | 11/2006 | Klei et al. |
| 2007/0009691 | A1 | 1/2007 | Barre et al. |
| 2007/0049678 | A1 | 3/2007 | Kim et al. |
| 2009/0166593 | A1 | 2/2009 | Kim et al. |
| 2009/0274896 | A1 | 11/2009 | Takeshi et al. |
| 2010/0264383 | A1 | 10/2010 | Tooley et al. |
| 2011/0015297 | A1 | 1/2011 | Destro et al. |
| 2014/0017335 | A1 | 1/2014 | Dimov et al. |
| 2015/0284559 | A1 | 10/2015 | Tai |
| 2016/0319128 | A1 | 11/2016 | Park et al. |
| 2016/0326670 | A1 | 11/2016 | Kang et al. |
| 2017/0198132 | A1 | 7/2017 | Choi et al. |
| 2018/0112056 | A1 | 4/2018 | Yang et al. |
| 2018/0118914 | A1 | 5/2018 | Bae et al. |
| 2018/0179314 | A1 | 6/2018 | Kim et al. |
| 2018/0179373 | A1 | 6/2018 | Kim et al. |
| 2018/0186989 | A1 | 7/2018 | Lee et al. |
| 2019/0299572 | A1 | 10/2019 | Hirabayashi |
| 2020/0079951 | A1 | 3/2020 | Yang |

FOREIGN PATENT DOCUMENTS

| | | | | |
|---|---|---|---|---|
| CN | 101001805 | A | 7/2007 | |
| CN | 101880426 | A | 11/2010 | |
| CN | 107974030 | A | 5/2018 | |
| EP | 1190622 | A1 | 3/2002 | |
| EP | 1510549 | A1 | 3/2005 | |
| EP | 3026082 | A1 | 6/2016 | |
| EP | 3326975 | A1 | 5/2018 | |
| EP | 3339367 | A1 | 6/2018 | |
| EP | 3339370 | A1 | 6/2018 | |
| EP | 3342817 | A1 | 7/2018 | |
| FR | 1439417 | A | 5/1966 | |
| GB | 1040287 | A | 8/1966 | |
| JP | 55-133424 | A | 10/1980 | |
| JP | 56-045419 | A | 4/1981 | |
| JP | 63-278951 | A | 11/1988 | |
| JP | 06-287547 | A1 | 10/1994 | |
| JP | 06-329854 | A | 11/1994 | |
| JP | 08-253640 | A | 10/1996 | |
| JP | 09-157512 | A | 6/1997 | |
| JP | 10-182927 | A | 7/1998 | |
| JP | H10195309 | A | 7/1998 | |
| JP | 10-251444 | A | 9/1998 | |
| JP | 11-035787 | A | 2/1999 | |
| JP | 11-263705 | A | 9/1999 | |
| JP | 2001-220464 | A | 8/2001 | |
| JP | 2001-220486 | A | 8/2001 | |
| JP | 2006-182841 | A1 | 7/2006 | |
| JP | 2008-065142 | A | 3/2008 | |
| JP | 2008-540731 | A | 11/2008 | |
| JP | 2009-91400 | A | 4/2009 | |
| JP | 2009-161758 | A | 7/2009 | |
| JP | 2014-172783 | A | 9/2014 | |
| JP | 2014-221708 | A | 11/2014 | |
| JP | 2016-121273 | A | 7/2016 | |
| KR | 10-2002-0008203 | A | 1/2002 | |
| KR | 10-2005-0025186 | A | 3/2005 | |
| KR | 10-0696385 | B1 | 3/2007 | |
| KR | 10-2007-0047073 | A | 5/2007 | |
| KR | 10-0833453 | B1 | 5/2008 | |
| KR | 10-2010-0087603 | A | 8/2010 | |
| KR | 10-1452020 | A | 6/2012 | |
| KR | 10-1292164 | B1 | 8/2013 | |
| KR | 10-1334283 | B1 | 11/2013 | |
| KR | 10-2014-0045782 | A | 4/2014 | |
| KR | 20140045782 | * | 4/2014 | C08J 7/06 |
| KR | 10-1452020 | B1 | 10/2014 | |
| KR | 10-2016-0083527 | A | 7/2016 | |
| KR | 10-2016-129746 | A | 11/2016 | |
| KR | 10-2016-0001572 | A | 9/2017 | |
| WO | 02/49985 | A1 | 6/2002 | |
| WO | 2014/084453 | A1 | 6/2014 | |
| WO | WO2015097106 | * | 7/2015 | C08J 9/00 |
| WO | 2018/117473 | A1 | 6/2018 | |
| WO | 2018/124594 | A1 | 7/2018 | |

OTHER PUBLICATIONS

Office Action in commonly owned Korean Application No. 10-2016-0184170 dated Sep. 6, 2018, pp. 1-6.
Extended Search Report in commonly owned European Application No. 17209267.8 dated Mar. 26, 2018, pp. 1-7.
Office Action in commonly owned Korean Application No. 10-2016-0176575 dated Nov. 1, 2018, pp. 1-7.
Office Action in commonly owned Korean Application No. 10-2017-0075940 dated Aug. 21, 2017, pp. 1-8.
Extended Search Report in commonly owned European Application No. 17198304.2 dated Mar. 12, 2018, pp. 1-5.
Office Action in commonly owned Taiwanese Application No. 106136641 dated Aug. 17, 2018, pp. 1-6.
Office Action in commonly owned U.S. Appl. No. 15/790,334 dated Apr. 16, 2019, pp. 1-18.
Office Action in commonly owned Korean Application No. 10-2017-0111807 dated Nov. 27, 2018, pp. 1-9.
Chandrakanth et al., "Synthesis and characterization of ZnO nanorods with a narrow size distribution", Royal Society of Chemistry, 2015, vol. 5, p. 49861-49870 (17 pages).
Tsai, "The Influence on Intensity Ratio of Peak Emission between Recombination of Free-Excitons and Deep-Defect for ZnO Nanostructure Evolution from Nanorods to Nanotubes", Proceedings of the 16th International Conference on Nanotechnology, Sendai, Japan, Aug. 22-25, 2016, pp. 387-389.
Machine translated English language equivalent of CN 101880426 (2010, 5 pages).
Machine translated English language equivalent of JP 2014-221708 (2014, 9 pages).
Extended Search Report in commonly owned European Application No. 17199720.8 dated Mar. 7, 2018, pp. 1-7.
Database WPI, Week 201463, Thomson Scientific, London, GB, Abstract of JP 2014-172783 (UBE Kagaku Kogyo KK), pp. 1-2.
Database WPI, Week 201654, Thomson Scientific, London, GB, Abstract of KR 2016-0083527 (Kolon Plastics Inc.), pp. 1-2.
Office Action in commonly owned U.S. Appl. No. 15/844,980 dated Sep. 11, 2019, pp. 1-5.
Machine translated English language equivalent of H09-061580, which is the same as JP Publication JP 10-251444 4998, 14 pages).
Final Office Action in commonly owned U.S. Appl. No. 15/844,980 dated Mar. 10, 2020, pp. 1-10.
Google translation of JP 11035787 (1999, 8 pages).
Google translation of JP 06287547 (1994, 5 pages).
Office Action in commonly owned U.S. Appl. No. 15/798,819 dated May 13, 2019, pp. 1-20.
Extended Search Report in commonly owned European Application No. 17210117.2, dated Apr. 30, 2018, pp. 1-5.
Office Action in commonly owned Korean Application No. 10-2016-0177857 dated Nov. 20, 2018, pp. 1-8.
Prasanna et al., "Insight into the Mechanism of Antibacterial Activity of ZnO: Surface Defects Mediated Reactive Oxygen Species Even in the Dark" Langmuir 2015, vol. 31, Jul. 29, 2015, p. 9155-9162.
Office Action in commonly owned Chinese Application No. 201711007395.8 dated Jul. 31, 2019, pp. 1-6.
Office Action in commonly owned Chinese Application No. 201711062077.1 dated Jul. 12, 2019, pp. 1-7.

(56) References Cited

OTHER PUBLICATIONS

Machine translated English language equivalent of CN 1919542 (2007, 5 pages).
Machine translated English language equivalent of JP Application No. H09-212736, which is the same as publication JP 11-035787 (1999, 10 pages).
International Search Report in commonly owned International Application No. PCT/KR2017/015048 dated Apr. 16, 2018, pp. 1-4.
Extended Search Report in commonly owned European Application No. 17888521.6 dated Jul. 10, 2020, pp. 1-6.
Office Action in commonly owned U.S. Appl. No. 15/845,020 dated Aug. 8, 2019, pp. 1-13.
Office Action in commonly owned U.S. Appl. No. 16/466,346 dated Jan. 19, 2021, pp. 1-10.
Office Action in commonly owned Japanese Application No. 2019-531331 dated Jul. 21, 2021, pp. 1-4.

* cited by examiner

FOAMING RESIN COMPOSITION, PREPARATION METHOD THEREFOR, AND FOAM USING SAME

CROSS-REFERENCE TO RELATED APPLICATIONS

This application claims priority to and the benefit of International Application No. PCT/KR2017/013955, filed Nov. 30, 2017, which published as WO 2018/117473 on Jun. 28, 2018; Korean Patent Application No. 10-2016-0177858, filed in the Korean Intellectual Property Office on Dec. 23, 2016; and Korean Patent Application No. 10-2017-0159551 filed in the Korean Intellectual Property Office on Nov. 27, 2017, the entire disclosure of each of which is incorporated herein by reference.

TECHNICAL FIELD

The present invention relates to a expandable resin composition, a method of preparing the same, and a foam formed of the same. More particularly, the present invention relates to a expandable resin composition which has good antibacterial properties and is beneficial to the human body while having good heat insulation properties, a method of preparing the same, and a foam formed of the same.

BACKGROUND ART

Expandable resins, particularly polystyrene-based expandable resins have good moldability, heat insulation properties, buffering properties, and thermal properties, and foam (foamed product) thereof is thus widely used as a packaging material for home appliances, a box of agricultural/marine products, a packaging material for processed foods, household goods, and a heat insulator for houses.

Particularly, for foam used as a packaging material for agricultural/marine products or processed foods or as a buffer material for soft-play facilities, techniques have been developed to add antibacterial agents to the foam to improve long-term freshness of foods during packaging, storage and transportation and to impart antibacterial/antifungal properties to the foam in use.

KR 10-2014-0045782 discloses a technique for producing antibacterial polystyrene by coating surfaces of resin beads with an antibacterial agent and a coating agent.

KR 10-0833453 discloses a molded article containing silver nanoparticles to provide benefits to the human body, and a method of manufacturing the same.

KR 10-2005-0025186 discloses expandable polystyrene particles having a functional skin layer, wherein the skin layer is formed by coating the surfaces of the polystyrene particles with a functional coating composition, and a method of manufacturing the same.

However, such techniques in the related art require a secondary process, that is, a coating process, after expansion of EPS, causing increase in process complexity. In addition, when nanoparticles are used, the particles are likely to be lost or to flow out of foam after the coating process, causing harm to the human body.

Therefore, there is a need for a expandable resin composition which can be manufactured by a simple process and can prevent loss or outflow of antibacterial agent particles, thereby exhibiting good antibacterial properties and thus providing benefits to the human body while having good heat insulation properties.

DISCLOSURE

Technical Problem

It is an object of the present invention to provide a expandable resin composition which can prevent loss or outflow of antibacterial agent particles, thereby exhibiting good antibacterial properties and thus providing benefits to the human body.

It is another object of the present invention to provide a expandable resin composition which has good heat insulation properties.

It is a further object of the present invention to provide a method of preparing a expandable resin composition, by which the expandable resin composition can be prepared in a simple manner without a separate coating process.

These and other objects of the present invention can be achieved by the present invention described below in detail.

Technical Solution

One aspect of the present invention relates to a expandable resin composition. The expandable resin composition includes: an aromatic vinyl resin; and zinc oxide, wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement and a BET surface area of about 1 m$^2$/g to about 10 m$^2$/g, as measured using a BET analyzer.

In one embodiment, the zinc oxide may be present in an amount of about 1 part by weight to about 10 parts by weight relative to 100 parts by weight of the aromatic vinyl resin.

In one embodiment, the aromatic vinyl resin may be a polymer of a monomer mixture including at least one selected from the group consisting of styrene, α-methylstyrene, vinyltoluene, and chlorostyrene.

In one embodiment, the zinc oxide may have an average particle size of about 0.5 μm to about 3 μm.

In one embodiment, the zinc oxide may have a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos\theta} \quad \langle \text{Equation 1} \rangle$$

where K is a shape factor, λ is an X-ray wavelength, β is an FWHM value (degree) of an X-ray diffraction peak, and θ is a peak position degree.

In one embodiment, the zinc oxide may have a peak intensity ratio (B/A) of about 0.05 to about 0.5, where A indicates a peak in the wavelength range of 370 nm to 390 nm and B indicates a peak in the wavelength range of 450 nm to 600 nm in photoluminescence measurement.

In one embodiment, the expandable resin composition may further include an expanding agent comprising at least one selected from the group consisting of a hydrocarbon compound and a fluorinated hydrocarbon.

Another aspect of the present invention relates to a method of preparing a expandable resin composition. The method includes: forming a mixed composition by mixing an aromatic vinyl resin and zinc oxide; and extruding the mixed composition while introducing an expanding agent into the mixed composition, wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement, and a BET surface area of about 1 m$^2$/g to about 10 m$^2$/g.

In one embodiment, the method includes: forming a polymer by polymerization of a reaction solution containing an aromatic vinyl monomer, an initiator, and zinc oxide; and introducing an expanding agent into the polymer, wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement and a BET surface area of about 1 m$^2$/g to about 10 m$^2$/g.

A further aspect of the present invention relates to a foam formed by expanding the expandable resin composition set forth above.

In one embodiment, the foam may have a thermal conductivity of about 0.030 W/m·K to about 0.038 W/m·K, as measured in accordance with KS L 9016.

In one embodiment, the foam may have an antibacterial activity against *Staphylococcus aureus* of about 2.0 to about 6.0 and an antibacterial activity against *Escherichia coli* of about 2.0 to about 5.0, as measured on 5 cm×5 cm specimens inoculated with *Staphylococcus aureus* and *Escherichia coli*, respectively, in accordance with JIS Z 2801 and calculated according to Equation 2:

Antibacterial activity=log($M1/M2$)  <Equation 2> wherein M1 is the number of bacteria as measured on a blank specimen after incubation under conditions of 35° C. and 90% RH for 24 hours, and M2 is the number of bacteria as measured on a specimen of the foam after incubation under conditions of 35° C. and 90% RH for 24 hours.

Advantageous Effects

The present invention provides a expandable resin composition which can prevent loss or outflow of antibacterial agent particles, thereby exhibiting good antibacterial properties and thus providing benefits to the human body while having good heat insulation properties, and a method of preparing the same, by which the expandable resin composition can be prepared in a simple manner without a separate coating process.

BEST MODE

Hereinafter, embodiments of the present invention will be described in detail.

A expandable resin composition according to the present invention includes an aromatic vinyl resin and zinc oxide.

(A) Aromatic Vinyl Resin

The aromatic vinyl resin according to the present invention may include any typical aromatic vinyl resin used in expandable resin compositions. For example, the aromatic vinyl resin may be a resin obtained by polymerization of a monomer mixture including at least one of styrene, α-methylstyrene, vinyltoluene, chlorostyrene, and the like. In some embodiments, the aromatic vinyl resin may be a styrene-based resin such as general purpose polystyrene (GPPS) and high-impact polystyrene (HIPS).

In one embodiment, the aromatic vinyl resin may have a weight average molecular weight of about 120,000 g/mol to about 400,000 g/mol, specifically about 150,000 g/mol to about 350,000 g/mol, for example, 120,000 g/mol, 150,000 g/mol, 200,000 g/mol, 250,000 g/mol, 300,000 g/mol, or 350,000 g/mol. Within this range, the expandable resin composition can exhibit sufficient Expandability while providing sufficient strength.

(B) Zinc Oxide

The zinc oxide according to the present invention may have a peak intensity ratio (B/A) of 0.01 to 1, specifically 0.05 to 0.5, more specifically 0.1 to 0.3, for example, 0.01, 0.05, 0.1, 0.15 0.2, 0.25, 0.3, 0.35, 0.4, 0.45, 0.5, 0.6, 0.65, 0.7, 0.75, 0.8, 0.85, 0.9, 0.95, or 1, where A indicates a peak in the wavelength range of 370 nm to 390 nm and B indicates a peak in the wavelength range of 450 nm to 600 nm in photoluminescence measurement and a BET surface area of about 1 m$^2$/g to about 10 m$^2$/g, specifically 2 m$^2$/g to 7 m$^2$/g, for example, 1 m$^2$/g, 2 m$^2$/g, 3 m$^2$/g, 4 m$^2$/g, 5 m$^2$/g, 6 m$^2$/g, 7 m$^2$/g, 8 m$^2$/g, 9 m$^2$/g, or 10 m$^2$/g, as measured by a nitrogen gas adsorption method using a BET analyzer.

If the peak intensity ratio (B/A) of the zinc oxide exceeds 1, the expandable resin composition can have high thermal conductivity and cannot have sufficient antibacterial properties. If the BET surface area of the zinc oxide is less than about 1 m$^2$/g, antibacterial properties of the expandable resin composition can be deteriorated due to decrease in surface area of the zinc oxide and the zinc oxide can exhibit poor dispersibility during polymerization or compounding of EPS, causing deterioration in mechanical properties or causing non-uniform cells and thus deterioration in heat insulation performance. If the BET surface area of the zinc oxide exceeds about 10 m$^2$/g, discoloration or decomposition of an EPS resin can occur due to decrease in particle size of the zinc oxide, causing a reduction in cell continuity and thus deterioration in heat insulation performance.

The zinc oxide may have an average particle size of about 0.5 μm to about 3 μm, specifically about 1 μm to about 3 μm, for example, 0.5 μm, 0.6 μm, 0.7 μm, 0.8 μm, 0.9 μm, 1 μm, 1.1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 2.6 μm, 2.7 μm, 2.8 μm, 2.9 μm, or 3 μm, as measured by a light scattering method (LS 13 320). Within this range, the zinc oxide can be prevented from loss or outflow.

The zinc oxide may have a peak position degree (2θ) in the range of about 35° to about 37° and a crystallite size of about 1,000 Å to about 2,000 Å, specifically about 1,200 Å to about 1,800 Å, for example, 1,100 Å, 1,200 Å, 1,300 Å, 1,400 Å, 1,500 Å, 1,600 Å, 1,700 Å, 1,800 Å, 1,900 Å, or 2,000 Å in X-ray diffraction (XRD) analysis, as calculated by Equation 1. Within this range, a foam manufactured using the expandable resin composition can have good antibacterial properties and heat insulation properties.

$$\text{Crystallite size }(D) = \frac{K\lambda}{\beta\cos\theta} \qquad \langle\text{Equation 1}\rangle$$

where K is a shape factor, λ is an X-ray wavelength, β is an FWHM value (degree) of an X-ray diffraction peak, and θ is a peak position degree.

The zinc oxide may have a purity of about 99% or more. Within this range, a foam manufactured using the expandable resin composition can have further improved antibacterial properties and heat insulation properties.

In some embodiments, the zinc oxide may be prepared by melting metallic zinc in a reactor, heating the molten zinc to about 850° C. to about 1,000° C., for example, about 900°

C. to about 950° C., to vaporize the molten zinc, injecting oxygen gas into the reactor, cooling the reactor to about 20° C. to about 30° C., heating the reactor to about 700° C. to about 800° C. for about 30 minutes to about 150 minutes while injecting nitrogen/hydrogen gas into the reactor, as needed, and cooling the reactor to room temperature (about 20° C. to about 30° C.).

In some embodiments, the zinc oxide may be present in an amount of about 1 part by weight to about 10 parts by weight, specifically about 2 parts by weight to about 5 parts by weight, for example, 1 part by weight, 2 parts by weight, 3 parts by weight, 4 parts by weight, 5 parts by weight, 6 parts by weight, 7 parts by weight, 8 parts by weight, 9 parts by weight, or 10 parts by weight, relative to about 100 parts by weight of the aromatic vinyl resin. Within this range, the zinc oxide can be uniformly dispersed in the aromatic vinyl resin and a foam manufactured using the expandable resin composition can have good weather resistance, antibacterial properties, and heat insulation properties.

(C) Expanding Agent

An expanding agent according to the present invention may be any typical expanding agent used in expandable resin compositions and examples thereof may include: hydrocarbon compounds such as propane, butane, isobutane, normal pentane, isopentane, cyclopentane, hexane, and mixtures thereof fluorinated hydrocarbons including hydrochlorofluorocarbons (HCFC) such as HCFC-142b and HCFC-123 and hydrofluorocarbons (HFC) such as HFC-123, and mixtures thereof; and mixtures thereof. These may be used alone or in combination thereof.

The expanding agent may be present in an amount of about 1 part by weight to 40 parts by weight, specifically about 3 parts by weight to about 20 parts by weight, for example, 1 part by weight, 5 parts by weight, 10 parts by weight, 15 parts by weight, 20 parts by weight, 25 parts by weight, 30 parts by weight, 35 parts by weight, or 40 parts by weight, relative to 100 parts by weight of the aromatic vinyl resin. Within this range, the expanding agent and the zinc oxide can be uniformly dispersed in the aromatic vinyl resin.

The expandable resin composition according to the present invention may further include typical additives such as a foaming aid, a compatibilizer, a surfactant, a gas barrier resin, a dispersant, an antiblocking agent, a flame retardant, a lubricant, and a nucleating agent, as needed.

The foaming aid serves to facilitate expansion and molding of the foaming composite resin particles and may be any typical foaming aid, for example, toluene, cyclohexane, and ethylbenzene.

The additives may be present in an amount of 0.01 parts by weight to 10 parts by weight relative to 100 parts by weight of the expandable resin composition, without being limited thereto.

In accordance with another aspect of the present invention, a method of preparing a expandable resin composition includes: forming a mixed composition by mixing the aromatic vinyl resin and the zinc oxide in the amounts set forth above; and extruding the mixed composition while introducing the expanding agent into the mixed composition in the amount set forth above (one-step extrusion).

Although there is no particular limitation on an extruder used in extrusion, a die plate may have a hole diameter of about 0.3 mm to about 2 mm, specifically about 0.5 mm to about 1.2 mm, for example, 0.3 mm, 0.4 mm, 0.5 mm, 0.6 mm, 0.7 mm, 0.8 mm, 0.9 mm, 1 mm, 1.1 mm 1.2 mm, 1.4 mm, 1.5 mm, 1.6 mm, 1.7 mm, 1.8 mm, 1.9 mm, or 2 mm, so as to obtain a desired level of grade. In addition, the melt-kneading extruder may have a temperature of about 135° C. to about 230° C., specifically about 150° C. to about 200° C., for example, 150° C., 160° C., 170° C., 180° C., 190° C., or 200° C. Further, the die plate may have a temperature of about 170° C. to about 350° C., preferably about 190° C. to about 300° C., for example, 190° C., 200° C., 210° C., 220° C., 230° C., 240° C., 250° C., 260° C., 270° C., 280° C., 290° C., or 300° C. Within this range, the expanding agent and the zinc oxide can be uniformly dispersed in the aromatic vinyl resin, and a foam manufactured using the expandable resin composition can have good compression strength and low thermal conductivity.

In some embodiments, the expandable resin composition may be pelletized by underwater cutting or the like, upon extrusion. Prepared pellets may have an average particle size of about 0.5 mm to about 5 mm. According to the present invention, the zinc oxide can be uniformly distributed on the surface and inside of the pellets. A foam obtained by expanding the pellets has a uniform distribution of zinc oxide particles on the surface and inside of cells.

In another embodiment, the expandable resin composition may be prepared by polymerization. A method of preparing the expandable resin composition according to this embodiment includes: forming a polymer by polymerizing a reaction solution containing an aromatic vinyl monomer, an initiator, and the zinc oxide; and introducing the expanding agent into the polymer.

The initiator may include benzoyl peroxide, dibenzoyl peroxide, lauryl peroxide, t-butyl peroxybenzoate, tertiary-amyl peroxy-2-ethylhexyl carbonate, tertiary-butyl peroxy isopropyl carbonate, and cumene hydroperoxide, without being limited thereto. These may be used alone or as a mixture thereof. The initiator may be present in an amount of about 0.01 parts by weight to about 3 parts by weight, preferably about 0.05 parts by weight to about 0.3 parts by weight, for example, 0.01 parts by weight, 0.05 parts by weight, 0.1 parts by weight, 0.5 parts by weight, 1 part by weight, 1.5 parts by weight, 2 parts by weight, 2.5 parts by weight, or 3 parts by weight, relative to 100 parts by weight of the aromatic vinyl monomer. If the amount of the initiator is outside this range, it can be difficult to control the polymerization reaction.

Here, the polymerization may be performed by suspension polymerization. In suspension polymerization, a dispersant may be used for dispersion stability and particle size control. Here, the dispersant may include polyvinyl alcohol, methylcellulose, polyvinylpyrrolidone, tricalcium phosphate, and magnesium pyrophosphate, without being limited thereto. These may be used alone or as a mixture thereof. The dispersant may be present in an amount of about 0.1 parts by weight to about 3 parts by weight, for example, 0.1 parts by weight, 0.5 parts by weight, 1 part by weight, 1.5 parts by weight, 2 parts by weight, 2.5 parts by weight, or 3 parts by weight, relative to 100 parts by weight of the aromatic vinyl monomer.

The method according the present invention does not require a separate coating process and thus can allow the expandable resin composition to be prepared by a simple process while minimizing loss of the zinc oxide due to the coating process.

The expandable resin composition obtained by the polymerization process may take the form of beads that have an average particle diameter of about 0.1 mm to about 5 mm. According to the present invention, the zinc oxide can be uniformly distributed on the surface and inside of the beads.

A foam obtained by expanding the beads has a uniform distribution of zinc oxide particles on the surface and inside of cells.

A further aspect of the present invention relates to a foam formed by expanding the expandable resin composition set forth above.

In some embodiments, the foam may be manufactured by charging (introducing) the expandable resin composition into a non-hermetic mold and fusing the expandable resin composition in the mold using, for example, hot air or steam at a pressure of about 0.1 kgf/cm² to about 5 kgf/cm². The foam can be easily manufactured by a person having ordinary skill in the art.

In some embodiments, the foam may have a thermal conductivity of about 0.030 W/m·K to about 0.038 W/m·K, specifically about 0.030 W/m·K to about 0.033 W/m·K, more specifically, about 0.0310 W/m·K to about 0.0325 W/m·K, for example, 0.030 W/m·K, 0.031 W/m·K, 0.032 W/m·K, 0.033 W/m·K, 0.034 W/m·K, 0.035 W/m·K, 0.036 W/m·K, 0.037 W/m·K, or 0.038 W/m·K, as measured in accordance with KS L 9016.

In some embodiments, the foam may have an antibacterial activity against Staphylococcus aureus of about 2.0 to about 6.0, for example, 2, 2.5, 3, 3.5, 4, 4.5, 5, 5.5, or 6, and an antibacterial activity against Escherichia coli of about 2.0 to about 5.0, for example, 2, 2.5, 3, 3.5, 4, 4.5, or 5, as measured on 5 cm×5 cm specimens inoculated with Staphylococcus aureus and Escherichia coli, respectively, in accordance with JIS Z 2801 and calculated according to Equation 2:

Antibacterial activity=log($M1/M2$) <Equation 2> where M1 is the number of bacteria as measured on a blank specimen after incubation under conditions of 35° C. and 90% RH for 24 hours and M2 is the number of bacteria as measured on a specimen of the foam after incubation under conditions of 35° C. and 90% RH for 24 hours.

In addition, the foam may have an average cell size of about 8 μm to about 100 μm, for example, about 10 μm to about 50 μm, as determined by observing the cross-section of the foam at 200× magnification using an optical microscope.

Next, the present invention will be described in more detail with reference to some examples. It should be understood that these examples are provided for illustration only and are not to be construed in any way as limiting the present invention.

EXAMPLE (A) Aromatic Vinyl Resin
(A1) General purpose polystyrene (GPPS) pellets having a weight average molecular weight of 270,000 g/mol (GP HR-2390P00, Cheil Industries Ltd.)
(A2) A resin obtained by adding dibenzoyl peroxide as an initiator (Enox, Chimei Chemical Company Ltd.) to a styrene monomer (Styrene, Aldrich Chemical)
(B) Zinc oxide: Zinc oxides listed in Table 1
(C) Expanding agent
n-pentane gas
(D) Additives
(D1) A lubricant (nucleating agent) (POLYWAX 660, PETROLITE Corp.)
(D2) A heat stabilizer (TINUBIN 770, CIBA Specialty Chemicals)
(D3) Polyvinyl alcohol (PVA) as a dispersant (PVA-205, Kuraray Chemical)
(D4) A mixture of TCP/ADP (weight ratio: 1.5/3.0) as a dispersant (TCP: tricalcium phosphate (hydroxyapatite, Samjo Industrial Co., Ltd.), ADP: ammonium dihydrogen phosphate (Fincol, Fine-Chemtech Co., Ltd.))
(D5) A mixture of D12/DN (weight ratio: 800/200 ppm) as a dispersant (D12: sodium alkylarylsulfonate (Neogen SCF, DAI-ICHI KOGYO SEIYAKU), DN: sodium 2-naphthalenesulfonate (Demol-L, KAO))

TABLE 1

|  | (Z1) | (Z2) | (Z3) | (Z4) | (Z5) |
|---|---|---|---|---|---|
| Average particle diameter (μm) | 1.2 | 1.0 | 1.1 | 1.0 | 1.0 |
| BET surface area (m²/g) | 4 | 6 | 15 | 11 | 4 |
| Purity (%) | 99 | 99 | 97 | 99 | 99 |
| PL peak intensity ratio (B/A) | 0.28 | 0.05 | 9.8 | 0.3 | 1.5 |
| Crystallite size (Å) | 1417 | 1229 | 503 | 1500 | 1600 |

Measurement of Properties of Zinc Oxide (1) Average particle diameter (unit: μm): Average particle diameter (volume average) was measured using a particle analyzer (Laser Diffraction Particle Size Analyzer LS 13 320, Beckman Coulter Co., Ltd.).

(2) BET surface area (unit: m²/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak A in the wavelength range of 370 nm to 390 nm to peak B in the wavelength range of 450 nm to 600 nm was measured. Here, an injection molded specimen was irradiated with laser beams without separate treatment upon PL analysis, and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's Equation (Equation 1) with reference to a measured FWHM value (full width at half maximum of a diffraction peak). Here, both a powder form and an injection molded specimen could be measured. For more accurate analysis, the injection molded specimen was subjected to heat treatment at 600° C. in air for 2 hours to remove a polymer resin therefrom before XRD analysis.

$$\text{Crystallite size } (D) = \frac{K\lambda}{\beta \cos\theta} \qquad \langle \text{Equation 1} \rangle$$

where K is a shape factor, λ is an X-ray wavelength, β is an FWHM value (degree) of an X-ray diffraction peak, and θ is a peak position degree.

Example 1

2 parts by weight of POLYWAX 660 (PETROLITE Corp.) as a lubricant, 0.2 parts by weight of TINUBIN 770

(CIBA Specialty Chemicals) as a heat stabilizer, and 2 parts by weight of zinc oxide (Z1) shown in Table 1 were mixed with 100 parts by weight of GPPS pellets having a weight average molecular weight of 270,000 g/mol (GP HR-2390P00, Cheil Industries Ltd.) to prepare a mixed composition, which, in turn, was pelletized by extrusion. Into a pressurized reactor, 100 parts by weight of the prepared pellets, 100 parts by weight of water, 1.5/3.0 parts by weight of TCP/ADP as a dispersant, and 800/200 ppm of D12/DN as a dispersant were placed, followed by dispersion of the pellets. The dispersed pellets were heated to 90° C., (a temperature near the glass transition temperature) under high-speed stirring conditions (200 rpm) and then pressurized to 5 kgf with nitrogen. Then, n-pentane gas as an expanding agent was injected into the reactor under nitrogen pressure of 10 kgf. After pressurization for 2 hours under these conditions, the reactor was cooled to room temperature (20° C.), followed by decompression to obtain a sample. The obtained sample (unexpanded EPS) was subjected to a typical process including expanding, ageing, and molding, thereby obtaining a foam having a density of 17 kg/m$^3$.

Example 2

100 parts by weight of water, 5 parts by weight of PVA as a dispersant, 20 parts by weight of a styrene monomer, 5 parts by weight of POLYWAX 660 (PETROLITE Corp.) as a nucleating agent, 0.4 part by weight of zinc oxide (Z2) shown in Table 1, and 0.2 parts by weight of dibenzoyl peroxide as an initiator were pressurized at 90° C. under nitrogen pressure of 0.5 kgf for 6 hours, followed by polymerization at 120° C. to prepare a polymer. Then, 40 parts by weight of n-pentane as an expanding agent was introduced into the polymer under nitrogen pressure of 10 kgf, followed by cooling to less than 60° C. subsequent to stirring at 120° C. for 6 hours, thereby preparing a expandable resin composition. Then, the expandable resin composition was subjected to dehydration and drying, thereby preparing unexpanded EPS powder. The prepared unexpanded EPS was subjected to a typical process including expanding, ageing and molding, thereby obtaining a foam having a density of 15.5 kg/m$^3$.

Comparative Example 1

A foam was prepared in the same manner as in Example 1 except that zinc oxide was not used.

Comparative Example 2

A foam was prepared in the same manner as in Example 2 except that zinc oxide was not used.

Comparative Example 3

A foam was prepared in the same manner as in Example 1 except that zinc oxide (Z3) was used.

Comparative Example 4

A foam was prepared in the same manner as in Example 1 except that zinc oxide (Z4) was used.

Comparative Example 5

A foam was prepared in the same manner as in Example 1 except that zinc oxide (Z5) was used.

Each of the foams obtained in Examples and Comparative Examples was evaluated as to the following properties, and results are shown in Table 2.

Property Evaluation (1) Antibacterial activity: Antibacterial activity was measured on 5 cm×5 cm specimens inoculated with *Staphylococcus aureus* and *Escherichia coli*, respectively, in accordance with JIS Z 2801 and calculated by Equation 2:

$$\text{Antibacterial activity} = \log(M1/M2) \quad \text{<Equation 2>}$$

where M1 is the number of bacteria as measured on a blank specimen (Stomacher, 400 POLY-BAG) after incubation under conditions of 35° C. and 90% RH for 24 hours and M2 is the number of bacteria as measured on a specimen of the foam after incubation under conditions of 35° C. and 90% RH for 24 hours.

(2) Average cell size of foam (unit: μm): Cell size of each of the foams prepared in Examples and Comparative Examples was determined by observing the cross-section of the foam at 200× magnification using an optical microscope. Sizes of 10 cells arbitrarily selected among cells of 3 or more expanded beads were measured, followed by averaging the measured values.

(3) Density (unit: kg/m$^3$): Each of the foams prepared in Examples and Comparative Examples was cut to a specimen having a size of 300 mm×300 mm×50 mm, which, in turn, was dried at a temperature of 60° C. or higher for 48 hours or more, followed by storage at room temperature for 24 hours, and then was measured as to weight before measurement of thermal conductivity. The measured value was divided by volume, thereby finding density of the specimen.

(4) Thermal conductivity (unit: W/m·K): Each of the foams prepared in Examples and Comparative Examples was cut to a specimen having a size of 300 mm×300 mm×50 mm, which, in turn, was dried at a temperature of 60° C. or higher for 48 hours or more, followed by storage at room temperature for 24 hours, and then was measured as to initial thermal conductivity using a heat flow meter (HFM 436, NETZSCH Gerate bau GmbH) in accordance with KS L 9016. Results are shown in Table 1.

(5) Expandability (unit: times): Each of the expandable resin compositions (mini pellets) prepared in Examples and Comparative Examples was expanded by supplying steam thereto at 0.2 kg/cm$^2$ for 5 minutes and dried in a drying chamber at 60° C. for 2 hours, followed by measurement of an expansion ratio. In measurement of the expansion ratio, the weight and volume of the dried expanded beads (foam) were measured using a mass cylinder and a scale to calculate the density of the beads, which in turn was divided by a pre-expansion density 1 g/cm$^3$ as 1 time of the beads to obtain an expansion ratio.

TABLE 2

|  | Example 1 | Example 2 | Comp. Example 1 | Comp. Example 2 | Comp. Example 3 | Comp. Example 4 | Comp. Example 5 |
| --- | --- | --- | --- | --- | --- | --- | --- |
| Kind of zinc oxide | Z1 | Z2 | — | — | Z3 | Z4 | Z5 |
| Average cell size (μm) | 10 | 40 | 10 | 40 | 8 | 5 | 40 |

TABLE 2-continued

|  | | Example 1 | Example 2 | Comp. Example 1 | Comp. Example 2 | Comp. Example 3 | Comp. Example 4 | Comp. Example 5 |
|---|---|---|---|---|---|---|---|---|
| Density (kg/m$^3$) | | 17 | 15.5 | 16 | 14.5 | 18 | 16 | 15.5 |
| Thermal conductivity (W/m · K) | | 0.038 | 0.037 | 0.038 | 0.038 | 0.17 | 0.15 | 0.16 |
| Expandability (times) | | 20 | 65 | 20 | 65 | 3 | 5 | 19 |
| Antibacterial activity | *Staphylococcus aureus* | 4.6 | 4.6 | 1.2 | 1.3 | 2.1 | 2.3 | 5.0 |
| | *Escherichia coli* | 3.4 | 3.4 | 0.5 | 0.8 | 1.3 | 1.0 | 3.8 |

From the results shown in Table 1, it can be seen that the foams of Comparative Examples 1 to 5 using zinc oxide outside the scope of the present invention exhibited poor antibacterial properties and heat insulation properties, and, particularly, some of the foams also exhibited poor formability.

It should be understood that various modifications, changes, alterations, and equivalent embodiments can be made by those skilled in the art without departing from the spirit and scope of the invention.

The invention claimed is:

1. A expandable resin composition comprising:
an aromatic vinyl resin; and
zinc oxide,
wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement, a BET surface area of about 1 m$^2$/g to about 10 m$^2$/g, as measured using a BET analyzer, a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta\cos\theta}$$

where K is a shape factor, λ is an X-ray wavelength, β is an FWHM value (degree) of an X-ray diffraction peak, and θ is a peak position degree.

2. The expandable resin composition according to claim 1, wherein the zinc oxide is present in an amount of about 1 part by weight to about 10 parts by weight relative to 100 parts by weight of the aromatic vinyl resin.

3. The expandable resin composition according to claim 1, wherein the aromatic vinyl resin is a polymer of a monomer mixture comprising styrene, α-methylstyrene, vinyltoluene, and/or chlorostyrene.

4. The expandable resin composition according to claim 1, wherein the zinc oxide has an average particle size of about 0.5 μm to about 3 μm.

5. The expandable resin composition according to claim 1, wherein the zinc oxide has a peak intensity ratio (B/A) of about 0.05 to about 0.5 in photoluminescence measurement.

6. The expandable resin composition according to claim 1, further comprising:
an expanding agent comprising a hydrocarbon compound and/or a fluorinated hydrocarbon.

7. A method of preparing an expandable resin composition, comprising:
forming a mixed composition by mixing an aromatic vinyl resin and zinc oxide; and
extruding the mixed composition while introducing an expanding agent into the mixed composition,
wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement, a BET surface area of about 1 m$^2$/g to about 10 m$^2$/g, a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta\cos\theta}$$

where K is a shape factor, λ is an X-ray wavelength, β is an FWHM value (degree) of an X-ray diffraction peak, and θ is a peak position degree.

8. A method of preparing an expandable resin composition, comprising:
forming a polymer by polymerization of a reaction solution comprising an aromatic vinyl monomer, an initiator, and zinc oxide; and
introducing an expanding agent into the polymer,
wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement, a BET surface area of about 1 m$^2$/g to about 10 m$^2$/g, a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta\cos\theta}$$

where K is a shape factor, λ is an X-ray wavelength, β is an FWHM value (degree) of an X-ray diffraction peak, and θ is a peak position degree.

9. The method according to claim 7, wherein the zinc oxide has an average particle diameter of about 0.5 μm to about 3 μm.

10. The method according to claim 7, wherein the zinc oxide has a peak intensity ratio (B/A) of about 0.05 to about 0.5 in photoluminescence measurement.

11. A foam formed by expanding the expandable resin composition according to claim 1.

12. The foam according to claim 11, wherein the foam has a thermal conductivity of about 0.030 W/m·K to about 0.038 W/m·K, as measured in accordance with KS L 9016.

13. The foam according to claim 11, wherein the foam has an antibacterial activity against *Staphylococcus aureus* of about 2.0 to about 6.0 and an antibacterial activity against *Escherichia coli* of about 2.0 to about 5.0, as measured on 5 cm×5 cm specimens inoculated with Staphylococcus aureus and *Escherichia coli*, respectively, in accordance with JIS Z 2801 and calculated according to Equation 2:

Antibacterial activity=log($M1/M2$)

where M1 is the number of bacteria as measured on a blank specimen after incubation under conditions of 35° C. and 90% RH for 24 hours and M2 is the number of bacteria as measured on a specimen of the foam after incubation under conditions of 35° C. and 90% RH for 24 hours.

14. The method according to claim 8, wherein the zinc oxide has an average particle diameter of about 0.5 μm to about 3 μm.

15. The method according to claim 8, wherein the zinc oxide has a peak intensity ratio (B/A) of about 0.05 to about 0.5 in photoluminescence measurement.

16. The expandable resin composition according to claim 1, wherein the zinc oxide has an average particle size of about 1 μm to about 3 μm.

17. The expandable resin composition according to claim 1, wherein the zinc oxide is distributed in the aromatic vinyl resin.

18. The foam according to claim 11, wherein the zinc oxide has an average particle size of about 1 μm to about 3 μm.

19. The foam according to claim 11, wherein the foam includes cells and wherein the zinc oxide is distributed inside the cells.

* * * * *